United States Patent [19]

Hares et al.

[11] 3,964,918

[45] June 22, 1976

[54] BARIUM BOROSILICATE OPTICAL GLASSES

[75] Inventors: George B. Hares; David W. Morgan, both of Corning, N.Y.

[73] Assignee: Corning Glass Works, Corning, N.Y.

[22] Filed: Dec. 6, 1974

[21] Appl. No.: 530,228

Related U.S. Application Data

[63] Continuation-in-part of Ser. No. 444,711, Feb. 22, 1974, abandoned.

[52] U.S. Cl. .............................. 106/47 Q; 106/53; 106/54; 106/73.2
[51] Int. Cl.² ............................................. C03C 3/00
[58] Field of Search ............ 106/47 Q, 54, 53, 73.2

[56] References Cited
UNITED STATES PATENTS

| | | | |
|---|---|---|---|
| 2,406,580 | 8/1946 | Bastick ............................ | 106/54 X |
| 2,518,028 | 8/1950 | Kreidl ................................. | 106/54 |
| 2,523,362 | 9/1950 | Fraser ............................... | 106/54 X |
| 2,702,749 | 2/1955 | Hafner .............................. | 106/54 X |
| 3,248,238 | 4/1966 | Faulstich............................ | 106/54 |
| 3,460,954 | 8/1969 | Young ................................ | 106/54 |
| 3,503,764 | 3/1970 | Young ................................ | 106/54 |
| 3,513,004 | 5/1970 | Kohut ................................. | 106/54 |
| 3,536,504 | 10/1970 | Faulstich et al. ................... | 106/54 |
| 3,726,698 | 4/1973 | Hares et al......................... | 106/54 |
| 3,740,242 | 6/1973 | Faulstich et al. ................ | 106/47 Q |

Primary Examiner—Patrick P. Garvin
Assistant Examiner—John F. Niebling
Attorney, Agent, or Firm—Clinton S. Janes, Jr.; Clarence R. Patty, Jr.

[57] ABSTRACT

A dense barium borosilicate glass is disclosed having a refractive index greater than 1.64 and a dispersive index of at least 53, together with a high degree of chemical durability such that optical blanks molded from the glass can be finished on automatic machinery with minimal danger of staining. The glass consists essentially of 18–30% $SiO_2$, 8–22% $B_2O_3$, 25–48% BaO, 0–10% other divalent metal oxides, 25–45% total divalent metal oxides, 10–30% $La_2O_3$, 0–6% $ZrO_2$ and/or $SnO_2$, with the mole ratio of $BaO:SiO_2$ not exceeding 0.6 and preferably not exceeding 0.5.

6 Claims, No Drawings

BARIUM BOROSILICATE OPTICAL GLASSES

This application is a continuation-in-part of our co-pending application Ser. No. 444,711, filed Feb. 22, 1974 and now abandoned.

BACKGROUND OF THE INVENTION AND PRIOR ART

Barium lanthana borosilicate glasses are well known for optical glass purposes as illustrated for example by U.S. Pat. No. 2,297,453 granted Sept. 29, 1942 to Berger and Rehm, No. 2,518,028 granted Aug. 8, 1950 to N. J. Kreidl, No. 2,523,362 granted Sept. 26, 1950 to W. A. Fraser et al., No. 2,576,521 granted Nov. 27, 1951 to Kreidl and Brewster, No. 3,081,178 granted Mar. 12, 1963 to G. Weissenberg et al., and No. 3,248,238 granted Apr. 26, 1966 to M. Faulstich. In general, the prior art, exemplified by these patents, has recognized that, while increasing the lanthana content of a glass is highly beneficial to the refractive index of a glass, it also creates a crystallization problem. To counter this, lanthana is either limited below ten percent, or relatively large contents of BaO and/or $B_2O_3$ are recommended. The latter also is used to attain a high dispersive index.

While these measures have mitigated, to some extent at least, the optical and devitrification problems, they have also resulted in diminished chemical durability. This can be tolerated in some optical glass applications, particularly where individual finishing is practiced. However, it leads to a serious glass staining problem in automated grinding and polishing operations now utilized to finish optical glass lenses and the like.

The prior art has recommended such additives as zirconia, titania, thoria and alumina to improve chemical durability, but Kreidl in U.S. Pat. No. 2,518,028 recognized that lanthanum barium borosilicates containing these additives were still chemically unstable and tended to dissolve in acidic media in general. Accordingly, he minimized lanthana and proposed adding such oxides as tantala ($Ta_2O_5$), niobia ($Nb_2O_5$) also known as columbium oxide, and cadmium oxide (CdO). However, the scarcity and high cost of such additives make this solution to the problem unsatisfactory.

SUMMARY OF THE INVENTION

We have now found that, for processing on automatic machinery, it is desirable that an optical glass shows a weight loss not exceeding one milligram per square centimeter (mg./cm.$^2$) of exposed surface when the glass is immersed in a 10% HCl solution at room temperature for 10 minutes. Our invention then consists of a small group of glasses which have been found capable of meeting this durability test and also providing required optical properties of a refractive index greater than 1.64 and a dispersive index of at least 53. These glasses consist essentially of, as calculated from the glass batch in weight percent on an oxide basis, 18–36% $SiO_2$, 8–22% $B_2O_3$, 25–48% BaO, 0–10% other divalent metal oxides, 25–48% total divalent metal oxides, 10–30% $La_2O_3$, 0–6% $ZrO_2$ and/or $SnO_2$, with the mole ratio of BaO:$SiO_2$ not exceeding 0.6 and preferably not exceeding 0.5.

GENERAL DESCRIPTION

The present glasses must contain at least 25% BaO plus at least 10% $La_2O_3$ to meet refractive index requirements. $La_2O_3$ is generally more effective than BaO in raising refractive index. However, it is also more expensive, and tends to increase glass liquidus temperatures thus causing crystallization problems. Coincident increases in BaO and $B_2O_3$ contents alleviate this condition somewhat, but other requirements limit these expedients. Accordingly, the $La_2O_3$ content should not exceed 30% by weight. We have found that at least 15% $La_2O_3$ is generally necessary in our present glasses to provide a refractive index over 1.67, and that over 20% $La_2O_3$ is required for an index over 1.68.

A substantial amount (at least 8%) of boric oxide ($B_2O_3$) is required to maintain the desired high dispersive index (nu value). Up to 22% may be present, but the boric oxide must be limited to permit adequate quantities of other oxides for optical purposes, as well as silica for durability.

It is a particular feature of the present glasses that the silica content must be at least 18% and may range up to 36%. Heretofore, silica has been treated primarily in its traditional role of a glass forming oxide, and thus an alternative to boric oxide, with the relationship of these oxides being determined by optical considerations. However, we have found that the chemical durability of our glasses, as measured by resistance to weight loss from acid attack, is directly related to silica content, and falls below the desired level when the silica is less than 18%.

We have further found that chemical durability of the present glasses, as measured by acid resistance, is directly related to the ratio of BaO to $SiO_2$ in the present glasses. In particular, we have found that, if the content of BaO substantially exceeds the 1:2 molecular ratio that characterizes barium disilicate, poor durability can be expected. Thus, the mole ratio of BaO:$SiO_2$ should not exceed about 0.6 and preferably does not exceed 0.5. Accordingly, the BaO content must not exceed about 48% by weight and preferably not over 45%.

Other divalent metal oxides, particularly ZnO, PbO and CaO, may be substituted in part for BaO if needed for such secondary purposes as melting aids, expansion adjustment or the like. With the exception of PbO which adversely affects dispersion, these oxides do not have as much effect as BaO on refractive index and also have an adverse effect on durability. Therefore, if present at all, the total divalent metal oxide content other than BaO should not exceed 10% and the total, including BaO, should not exceed 48%. Further, the substitute oxides should be considered in determining whether a glass meets the BaO:$SiO_2$ ratio so that ratio RO:$SiO_2$ likewise should not exceed 0.6.

It is desirable, although not essential, that the present glasses contain a small amount of zirconia and/or tin oxide ($SnO_2$). These oxides enhance the refractive index and may also improve chemical durability. However, large amounts of zirconia may create melting and/or crystallization problems. Also, both oxides tend to depress the dispersive index of a glass. Therefore, we prefer to limit the content of these oxides, individually or collectively, to 6%.

Minor amounts of other compatible glassmaking ingredients, while generally undesirable for purposes of the invention, may usually be tolerated where desired for secondary purposes. Thus, minor amounts of fining agents, including alkali metal halides, may be present. Also, a small amount of $CeO_2$ could be substituted for lanthana in a glass to provide a desired ultraviolet cutoff.

As specified earlier, chemical durability of the present glasses is measured in terms of resistance to weight loss from acid attack. The surface area on a polished glass sample is carefully measured and the same is then immersed in a 10% by weight solution of hydrochloric acid (HCl) at room temperature. After ten minutes exposure, the sample is removed, carefully rinsed and dried. The sample is weighed before and after the acid exposure, the difference representing glass loss by acid attack or dissolution. This is divided by the surface area exposed, as measured in square centimeters, to give a comparative weight loss value in mgs./cm.$^2$.

DESCRIPTION OF SPECIFIC EMBODIMENTS

The invention is further illustrated in Table I below by reference to specific embodiments thereof, each composition being set forth in both weight and mole percent, as calculated from the glass batch on an oxide basis. In addition, the table records optical properties for each glass, using the designations ($n_e$) for refractive index and $V_e$ for dispersive index, and the measured value for glass durability as shown by weight loss (wt. loss) in mgs./cm.$^2$.

TABLE I

| | 1 | 2 | 3 | 4 | 5 |
|---|---|---|---|---|---|
| | | Weight % | | | |
| $SiO_2$ | 30.5 | 32.6 | 32.6 | 30.0 | 35.1 |
| BaO | 36.8 | 38.2 | 40.7 | 40.7 | 40.7 |
| $La_2O_3$ | 12.4 | 15.2 | 12.7 | 15.2 | 10.1 |
| $B_2O_3$ | 15.1 | 10.2 | 10.2 | 10.2 | 10.2 |
| $ZrO_2$ | 5.0 | 3.6 | 3.6 | 3.6 | 3.6 |
| $SnO_2$ | — | — | — | — | — |
| $Sb_2O_3$ | 0.2 | 0.2 | 0.2 | 0.2 | 0.2 |
| $As_2O_3$ | — | — | — | — | — |
| $Na_2O$ | — | — | — | — | — |
| | | Mol % | | | |
| | 1 | 2 | 3 | 4 | 5 |
| $SiO_2$ | 48.6 | 53.4 | 53.0 | 50.5 | 55.2 |
| BaO | 22.8 | 24.5 | 26.0 | 26.8 | 25.1 |
| $La_2O_3$ | 3.8 | 4.7 | 3.8 | 4.7 | 2.9 |
| $B_2O_3$ | 20.9 | 14.4 | 14.3 | 14.8 | 13.8 |
| $ZrO_2$ | 3.8 | 2.8 | 2.8 | 2.9 | 2.7 |
| $SnO_2$ | — | — | — | — | — |
| $Sb_2O_3$ | 0.1 | 0.1 | 0.1 | 0.1 | 0.1 |
| $As_2O_3$ | — | — | — | — | — |
| $Na_2O$ | — | — | — | — | — |
| $BaO:SiO_2$ | 0.47 | 0.46 | 0.49 | 0.53 | 0.45 |
| $n_e$ | 1.653 | 1.657 | 1.656 | 1.667 | 1.646 |
| $V_e$ | 55.5 | 54.8 | 55.1 | 54.2 | 55.7 |
| Wt. Loss | 0.34 | 0.08 | 0.18 | 0.77 | 0.06 |

| | 6 | 7 | 8 | 9 | 10 |
|---|---|---|---|---|---|
| | | Weight % | | | |
| $SiO_2$ | 31.4 | 30.1 | 20.9 | 26.0 | 30.4 |
| BaO | 39.6 | 39.8 | 29.0 | 35.5 | 41.8 |
| $La_2O_3$ | 14.8 | 14.8 | 26.2 | 12.6 | 12.7 |
| $B_2O_3$ | 9.9 | 9.9 | 20.0 | 20.3 | 11.3 |
| $ZrO_2$ | — | 5.0 | 3.7 | 5.1 | 3.5 |
| $SnO_2$ | 4.0 | — | — | — | — |
| $Sb_2O_3$ | 0.2 | 0.2 | 0.2 | — | 0.2 |
| $As_2O_3$ | — | — | — | 0.1 | — |
| $Na_2O$ | — | — | — | 0.2 | — |
| | | Mol % | | | |
| | 6 | 7 | 8 | 9 | 10 |
| $SiO_2$ | 52.5 | 50.5 | 37.2 | 41.7 | 50.1 |
| BaO | 25.9 | 26.2 | 20.2 | 22.4 | 27.0 |
| $La_2O_3$ | 4.6 | 4.6 | 8.6 | 3.7 | 3.9 |
| $B_2O_3$ | 14.3 | 14.4 | 30.6 | 27.9 | 16.0 |
| $ZrO_2$ | — | 4.1 | 3.2 | 3.9 | 2.8 |
| $SnO_2$ | 2.6 | — | — | — | — |
| $Sb_2O_3$ | 0.1 | 0.1 | 0.1 | — | 0.1 |
| $As_2O_3$ | — | — | — | 0.1 | — |
| $Na_2O$ | — | — | — | 0.3 | — |
| $BaO:SiO_2$ | 0.49 | 0.52 | 0.54 | 0.54 | 0.54 |
| $n_e$ | 1.658 | 1.669 | 1.682 | 1.651 | 1.661 |
| $V_e$ | 55.3 | 53.7 | 54.6 | 56.1 | 54.6 |
| Wt. Loss | 0.26 | 0.63 | 0.44 | 0.56 | 0.73 |

Batches from which these glasses may be melted can be formulated from conventional glass batch ingredients including the respective oxides, boric acid, and barium and lanthanum carbonates. High purity raw materials are preferred to insure optical quality glass. The glasses are preferably melted in an electrically heated unit at 1450°C. and delivered for molding in accordance with conventional optical glass melting practice.

The improvement over previously available glasses offering similar optical properties may be seen from a comparison of a prior commercial glass A with the first example of TABLE I, the property designations and composition calculations being as described there.

TABLE II

| | A | | 1 | |
|---|---|---|---|---|
| | Wt.% | Mol% | Wt.% | Mol% |
| $SiO_2$ | 19.2 | 30.0 | 30.5 | 48.6 |
| $B_2O_3$ | 19.9 | 26.6 | 15.1 | 20.9 |
| BaO | 47.4 | 29.1 | 36.8 | 22.8 |
| $La_2O_3$ | 1.8 | 0.6 | 12.4 | 3.8 |
| ZnO | 8.5 | 10.0 | — | — |
| $ZrO_2$ | 1.0 | 0.7 | 5.0 | 3.8 |
| $Al_2O_3$ | 1.0 | 0.9 | — | — |
| CaO | 1.0 | 1.7 | — | — |
| $Na_2O$ | 0.2 | 0.3 | — | — |
| $As_2O_3$ | 0.2 | 0.1 | — | — |
| $Sb_2O_3$ | — | — | 0.2 | 0.1 |
| $RO:SiO_2$ | | 1.36 | | 0.47 |
| $n_e$ | 1.656 | | 1.653 | |
| $V_e$ | 54.7 | | 55.5 | |
| Wt. Loss | 24.0 | | 0.34 | |

An almost phenomenal increase in durability is achieved by suitable control of the $BaO:SiO_2$ ratio in accordance with the present invention.

The criticality of the present composition limits may also be seen from the following comparison of two glasses, B and C, similar to the present glasses both in composition and optical properties, and the glasses of TABLE I.

TABLE III

| | B | | C | |
|---|---|---|---|---|
| | Wt.% | Mol% | Wt.% | Mol% |
| $SiO_2$ | 28.8 | 49.5 | 27.1 | 45.6 |
| $B_2O_3$ | 9.9 | 14.5 | 14.9 | 21.5 |
| BaO | 46.3 | 31.3 | 43.0 | 28.3 |
| $La_2O_3$ | 14.8 | 4.6 | 14.8 | 4.5 |
| $ZrO_2$ | — | — | — | — |
| $Sb_2O_3$ | 0.2 | 0.1 | 0.2 | 0.1 |
| $BaO:SiO_2$ | | 0.63 | | 0.62 |
| $n_e$ | 1.663 | | 1.655 | |
| $V_e$ | 54.0 | | 56.1 | |
| Wt. Loss | 16.8 | | 9.1 | |

In both glasses B and C, the excessive BaO content sharply increases the weight loss from acid attack.

TABLE IV, below, presents a similar comparison of five glasses having essentially identical $B_2O_3$ and $La_2O_3$ contents as well as identical BaO contents except for Example B. The essential composition variations in glasses E, F, G and H are substitutions of varying amounts of $ZrO_2$ and/or $SnO_2$ for $SiO_2$. The composition of each glass, as calculated from the batch in both weight and mole percent on an oxide basis, is presented together with refractive and dispersive indices measured on the glasses, and weight loss determinations as a measure of chemical durability.

TABLE IV

| | E | F | G | H | B |
|---|---|---|---|---|---|
| Weight % | | | | | |
| $SiO_2$ | 35.5 | 30.2 | 29.9 | 29.6 | 28.8 |
| $B_2O_3$ | 9.9 | 10.0 | 10.0 | 9.9 | 9.9 |
| BaO | 39.6 | 39.8 | 39.7 | 39.6 | 46.3 |
| $La_2O_3$ | 14.8 | 14.8 | 14.8 | 14.8 | 14.8 |
| $ZrO_2$ | — | 5.0 | 2.5 | — | — |
| $SnO_2$ | — | — | 2.9 | 5.9 | — |
| $Sb_2O_3$ | 0.2 | 0.2 | 0.2 | 0.2 | 0.2 |
| Mol% | | | | | |
| $SiO_2$ | 57.0 | 50.5 | 50.5 | 50.4 | 49.5 |
| $B_2O_3$ | 13.6 | 14.4 | 14.5 | 14.4 | 14.5 |
| BaO | 25.0 | 26.2 | 26.4 | 26.5 | 31.3 |
| $La_2O_3$ | 4.3 | 4.6 | 4.6 | 4.6 | 4.6 |
| $ZrO_2$ | — | 4.1 | 2.0 | — | — |
| $SnO_2$ | — | — | 1.9 | 4.0 | — |
| $Sb_2O_3$ | 0.1 | 0.1 | 0.1 | 0.1 | 0.1 |
| $BaO:SiO_2$ | 0.44 | 0.52 | 0.52 | 0.53 | 0.63 |
| $n_e$ | 1.641 | 1.669 | 1.662 | 1.666 | 1.663 |
| $V_e$ | 56.7 | 53.7 | 54.2 | 54.6 | 54.0 |
| Wt. Loss | 0.19 | 0.63 | 0.85 | 0.29 | 16.8 |

The effects of zirconia and/or tin oxide substitutions for silica on the refractive and dispersive indices are apparent. The two oxides have no substantial difference in effect on chemical durability when substituted for silica. The substitution of either oxide for $SiO_2$ obviously alters the $BaO:SiO_2$ mole ratio of the glass somewhat, and this does affect durability. However, it is quite apparent that a BaO for $SiO_2$ substitution (Example B) having a similar influence on optical properties has a much more drastic influence on chemical durability.

We claim:

1. A lanthana-baria-borosilicate optical glass having a refractive index greater than 1.64, a dispersive index of at least 53, a weight loss not exceeding 1 mg./cm.$^2$ when immersed in a 10% HCl solution at room temperature for ten minutes, and being composed essentially of, as calculated from the batch in weight percent on an oxide basis, 18–36% $SiO_2$, 8–22% $B_2O_3$, 25–48% BaO, 0–10% of the other divalent metal oxides ZnO, PbO, and/or CaO, the total divalent metal oxide (RO) content being 25–48%, and 10–30% $La_2O_3$, the mole ratio of $RO:SiO_2$ not exceeding 0.6.

2. A glass in accordance with claim 1 containing up to 6% of $ZrO_2$ and/or $SnO_2$.

3. A glass in accordance with claim 1 wherein the mole ratio of $BaO:SiO_2$ does not exceed 0.5.

4. A glass in accordance with claim 1 having a refractive index greater than 1.67 and an $La_2O_3$ content of at least 15%.

5. A glass in accordance with claim 1 having a refractive index greater than 1.68 and an $La_2O_3$ content of at least 20%.

6. A glass in accordance with claim 1 wherein the BaO content is not over 45%.

* * * * *

UNITED STATES PATENT OFFICE
CERTIFICATE OF CORRECTION

PATENT NO. : 3,964,918
DATED : June 22, 1976
INVENTOR(S) : George B. Hares and David W. Morgan It is certified that error appears in the above-identified patent and that said Letters Patent are hereby corrected as shown below:

Front Page, Item [57] Abstract, line 7, "18-30% $SiO_2$," should be -- 18-36% $SiO_2$, --.

Front Page, Item [57] Abstract, line 8, "25-45%" should be -- 25-48% --.

Signed and Sealed this

Fourteenth Day of September 1976

[SEAL]

Attest:

RUTH C. MASON
Attesting Officer

C. MARSHALL DANN
Commissioner of Patents and Trademarks